Feb. 12, 1935.  A. E. HINE  1,991,213
DRY MATERIAL FEEDING APPARATUS
Original Filed Oct. 6, 1930  2 Sheets-Sheet 2
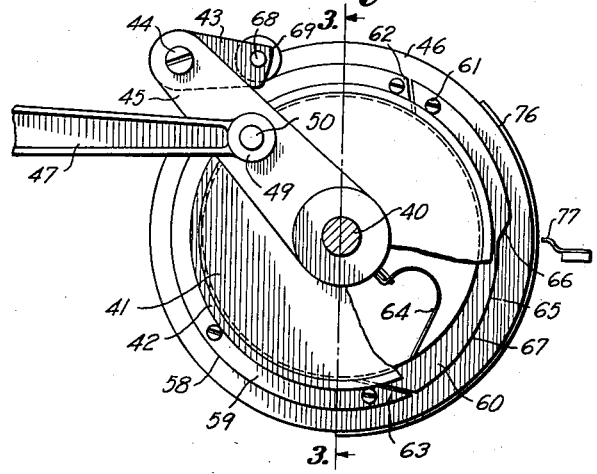
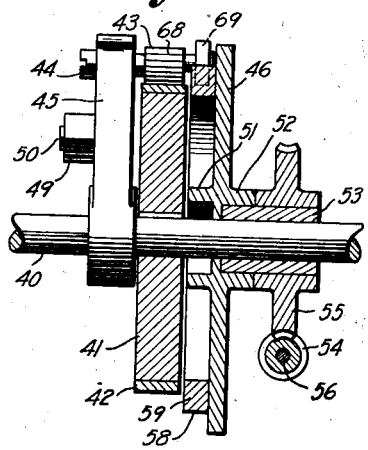
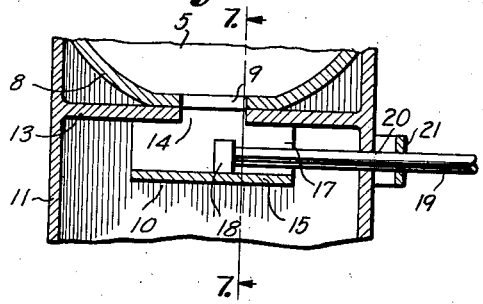
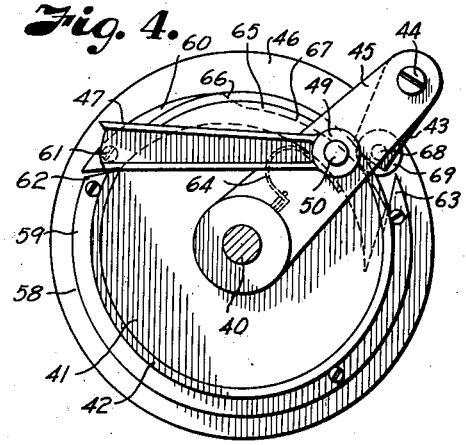
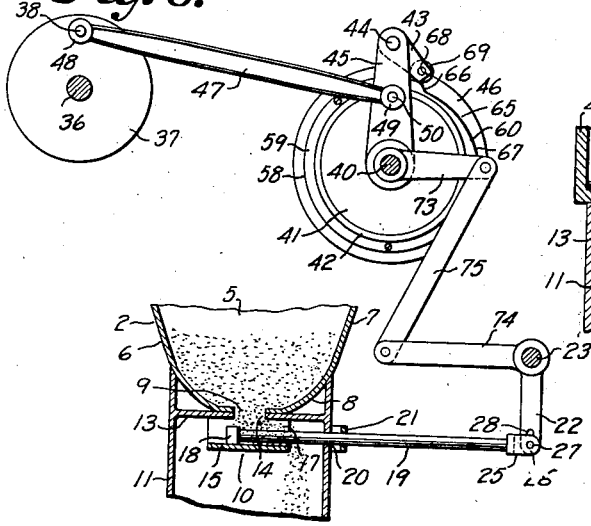
INVENTOR.
Alfred E. Hine
BY
ATTORNEY.

Patented Feb. 12, 1935

1,991,213

UNITED STATES PATENT OFFICE 1,991,213

DRY MATERIAL FEEDING APPARATUS

Alfred E. Hine, Sedalia, Mo., assignor to Eric W. Bacharach, Kansas City, Mo.

Original application October 6, 1930, Serial No. 486,700. Divided and this application July 28, 1932, Serial No. 625,391

5 Claims. (Cl. 221—118)

This invention relates to a dry material feeding apparatus and more particularly to a machine for feeding dry chemicals in measured quantities to provide a predetermined chemical solution, the present application being a division of application Serial No. 486,700, and has for its principal object to provide for feeding a dry material in accurately determined amounts proportionate to the flow of a liquid to form a solution of predetermined strength.

In accomplishing this and other objects of the invention, I have provided improved details of structure, the preferred form of which is illustrated in the accompanying drawings, wherein:

Fig. 2 is a side elevational view of the feed control members for effecting intermittent operation of the power shaft in a continuous direction.

Fig. 3 is a vertical, sectional view on the line 3—3, Fig. 2, particularly illustrating the control members for adjusting the number of intermittent impulses during each stroke of the dispensing plunger.

Fig. 4 is a view similar to Fig. 2, illustrating the driving pawl in driving relation with the disk for effecting intermittent rotation of the power shaft in a continuous direction.

Fig. 5 is an enlarged sectional view of the lower end of the hopper and the material dispensing plunger.

Fig. 6 is a diagrammatic view of the plunger actuating mechanism.

Fig. 7 is a section on the line 7—7, Fig. 5.

Figure 1:
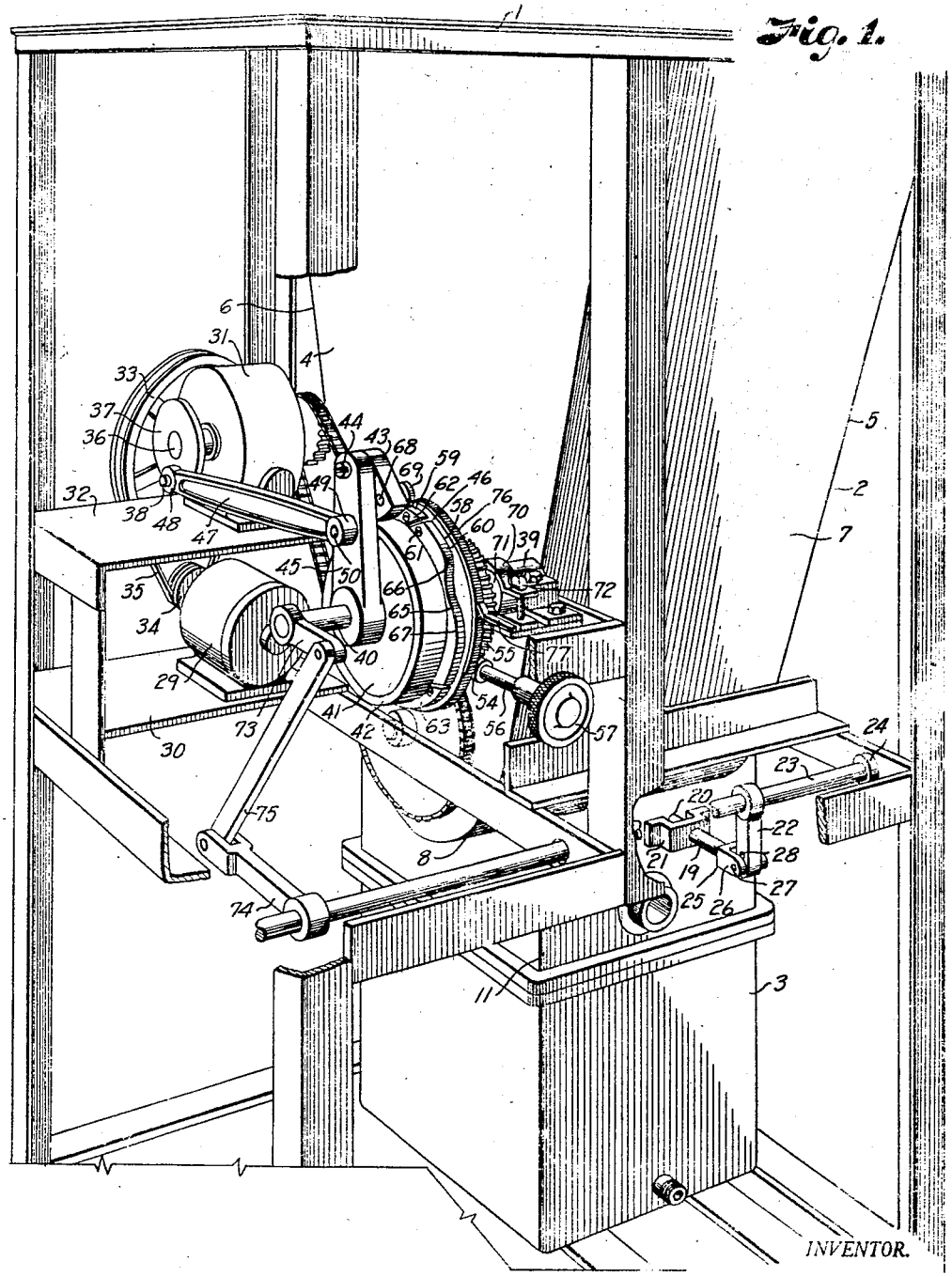
Fig. 1 is a perspective view of a dry material feeding machine constructed in accordance with my invention.

Referring more in detail to the drawings:—

1 designates a frame for supporting a hopper 2 containing a dry chemical material to be discharged into a mixing tank 3 which is spaced therefrom and also carried by the frame 1.

The hopper 2 includes end walls 4 and 5 and downwardly and inwardly diverging side walls 6 and 7 terminating in a substantially semi-cylindrical bottom 8 that is provided, substantially in its center, with a material discharge outlet 9 through which the material may gravitate onto a receiving member 10 later described. Connected with the bottom of the hopper and the upper walls of the mixing tank 6 is a housing member 11 for guiding discharge material into the mixing tank.

Extending horizontally across the housing 11 at a point directly below the curved bottom of the hopper is a partition 13 having an opening 14 therein coinciding with the opening in the hopper previously described.

The receiving member 10 preferably includes a rectangular, channel-shaped trough having a flat bottom 15 of substantially the width of the openings 9 and 14 but of greater length to form a support for the material discharged therethrough. The sides 16 and 17 of the trough are attached to the under face of the horizontal partition to form a guideway for a plunger 18 which is adapted to be reciprocated to discharge the material off the opposite open ends of the trough. Fixed to the plunger 18 is a rod 19 that is slidably mounted in an opening 20 in a side wall of the housing 11 and in a bearing bracket 21 attached to the outer face of the side wall, as best illustrated in Fig. 1. The opposite end of the rod is operably connected with a lever arm 22 depending from a rock shaft 23 that is rotatably mounted on the frame 1 in bearings 24 and extends in spaced, parallel relation with the axis of the bottom of the hopper.

The arm 22 is preferably connected to the end of the rod 19 by means of a yoke-shaped head 25 having spaced ears 26 engaging opposite sides of the arm and carrying a pivot pin 27 that extends through a slotted opening 28 in the end of the arm to prevent binding of the rod 19 in its bearings as the arm swings in an arc relative to the shaft 23.

The shaft 23 is rocked in one direction by a series of intermittent impulses and then in the opposite direction by a similar series of intermittent impulses to dispense the material from the ends of the trough, that is, the plunger starts its stroke at one end of the trough and is moved by a series of intermittent steps to the opposite end of the trough, and during each intermittent movement a proportionate quantity of material is pushed from the end of the trough. When the plunger reaches the end of its stroke, it is returned by a series of intermittent steps, discharging the material which has flowed in back of the plunger during its forward travel from the opposite end of the trough.

It is thus apparent that the stroke of the plunger may be constant and that the length of the steps or the increments of movement may be varied to control the total amount of material discharged from the plate upon each stroke of the plunger. To accomplish this movement of the plunger, I provide an apparatus for actuating the rock shaft, as now to be described.

The frame 1 extends laterally from the side of the hopper to support an actuating mechanism including a motor 29 carried on a platform 30, and a transmission indicated by the housing 31 which is carried on a platform 32 positioned above the motor platform for reducing the speed of the motor to that required for operating the plunger actuating mechanism, as well as a suitable cutting mechanism in the hopper.

The transmission 31 may be of any conventional type and its driving shaft is provided with a pulley 33 operable from a pulley 34 on the motor through a belt 35. The driven shaft 36 of the transmission is provided on one end with a disk 37 carrying an eccentric pin 38.

Rotatably supported by the frame extension at a point above the rock shaft 23 in bearings 39 is a shaft 40 which is intermittently actuated from the eccentric disk 37, as now described. Fixed on the shaft is a disk 41 having its periphery preferably covered with a friction band 42 that is adapted to be intermittently engaged by a pawl 43 when it is reciprocated over the periphery of the disk in one direction.

The pawl 43 is pivotally carried on a pin 44 projecting from the end of a rocker arm 45 which is loosely mounted on the shaft 40 adjacent the side face of the disk 41 so that the pawl 43 may operate on the friction band under control of a regulating disk 46 later described.

The arm 45 is operably connected with the eccentric pin 38 by a connecting link or pitman 47 having bearings 48 and 49 at its ends to engage the wrist pin, and a similar pin 50 projecting from the side face of the rocker arm, as best illustrated in Figs. 1 and 2.

The control disk 46 is larger in diameter than the disk 41 and includes hub members 51 and 52 on opposite sides thereof to form respectively a spring supporting bracket and a socket for the inner end of a sleeve 53 that is mounted on the shaft 40 and fixed within the socket to the control disk.

The sleeve 53 is adapted to be moved rotatably in either direction and to be fixed in selected position by a worm 54 meshing with a worm gear 55 fixed to the outer end of the sleeve and in juxtaposition to the disk 46. The worm 54 is fixed to a shaft 56 rotatably mounted in the frame extension, and is actuated by a hand wheel 57, as is illustrated in Fig. 1.

Mounted on the side face of the control disk 46 adjacent the disk 41 is a circular track 58 including a fixed arcuate section 59 of larger diameter than the diameter of the disk 41, and a movable arcuate section 60 pivoted to the face of the disk by a pin 61. The movable segment 60 cooperates with the section 59 to complete the periphery of the track 58.

The ends 62 and 63 of the fixed section 59 are preferably bevelled to correspond with similarly bevelled ends on the movable section 60 to limit movement of the movable section in an outward driection under influence of a leaf spring 64 having one end fixed to the bracket 51 and its opposite end bearing against the free end of the movable section to normally retain the movable section in cooperative relation with the fixed section 59.

The outer face of the movable section is provided with a depression 65 and includes a steeply sloping portion 66 adjacent the pivot point 61 and a gradually sloping portion 67 extending from the terminal 66 to the end of the movable section.

Freely rotatable on a lateral pin 60 rigidly attached to the pawl 43 is a roller 69 running on the composite track just described and in constant engagement therewith to limit inward movement of the pawl toward the periphery of the disk 41 except when the roller enters the depression 65 in the movable segment. When the roller moves off the steeply inclined portion 66, the pawl drops into engagement with the face of the disk 41, and, upon further movement of the pawl, the pawl depresses the movable section until the rocker arm has reached the limit of its movement.

On the return movement of the rocker arm under influence of the connecting link 47, the leaf spring 64 returns the movable section of the track to normal position, moving the roller therewith and lifting the pawl from sliding engagement retractively over the face of the disk 41.

An adjustable brake, including a clamp band 70, engages the drum 71 on the shaft 40, and a brake operating member 72 is mounted on the bearing support for the shaft to exert sufficient pressure against the shaft so that the pawl will at all times operate against a load capable of locking the pawl with the wheel.

The driving connection between the shaft 23 and the shaft 40 is such as to convert the intermittent rotation of the shaft 40 in one direction into rocking of the shaft 23 in alternate directions by a series of intermittent steps, as now described.

Fixed on the outer end of the shaft 40 is a lever arm 73 operably connected with a lever arm 74 on the shaft 23 by a link 75 so that as the arm 73 intermittently moves on the downward part of its cycle the arm 74 is swung downwardly to rock the shaft 23 in an anti-clockwise direction, Fig. 1, to move the plunger 18 in one direction, and when the lever arm 73 moves upwardly on the other half of its cycle the shaft 23 is rocked in a clockwise direction to move the plunger in the opposite direction.

In using an apparatus constructed and assembled as described, the track adjusting wheel 46 will be rotated to set the device for effecting the desired increments of movement for the shaft 40 upon each driving oscillation of the rocker arm. When zero on a scale 76, that is mounted on the disk 46, is opposite the pointer 77, the pawl will not engage the disk at any point in its stroke because the wheel on the pawl does not move far enough to engage the depression 65. Consequently, there would be no movement of the disk. However, when the maximum point of the scale is opposite the pointer, the pawl will engage the wheel at the beginning of its forward stroke and will continue to engage and drive the wheel forwardly until the end of its stroke. In other words, in this maximum setting the disk will be rotated approximately 90° with each forward stroke of the pawl, thereby rotating the shaft 40 90° upon each operation of the rocker arm.

With this setting of the scale the track is so arranged relatively to the retractive position of the pawl that the roller drops into the depression immediately at the beginning of its forward movement, so that the end of the pawl engages the track and causes depression of the segment until the rocker arm has reached the end of its stroke. Upon beginning the retractive movement of the rocker arm, the driving pressure of the pawl on the disk 41 is relieved to permit the spring 64 to lift the pawl from engagement with the disk.

By setting the scale at any intermediate point between zero and maximum position, any desired increment of movement of the shaft 40 may be provided from zero to the maximum.

The intermittent rotation of the shaft 40 moves the lever arm 73 intermittently in a downward direction as the crank arm moves from its top center to its bottom center on the right hand side of its planetation (Fig. 6), and by a series of intermittent impulses in an upward direction during planetation from its bottom center to its top center, thereby rocking the shaft 23 to transfer similar pulsations to the plunger 18 in its movement across the receiving member 10 to displace substantially equal amounts of material as it reciprocates thereacross.

The reciprocating speed of the rocker arm is constant, that is, it may be made to reciprocate a definite number of times per minute. Once this speed is set the rocker arm and, consequently, the pawl will reciprocate the same number of strokes per minute. Therefore, the speed with which the disk 41 rotates is determined entirely by the length of thrust given to the wheel by the pawl, and this in turn is regulated by setting of the scale which fixes the relationship between the depression in the movable section of the track and the roller on the pawl, thereby definitely determining the increments of movement during each stroke of the plunger, the length of the plunger being constant.

It is thus apparent that the material is intermittently discharged in equal amounts proportionate to the increments of movement. This is an important feature as distinguished from feeding machines where the plunger moves through varying strokes, because where the length of the plunger is varied to vary the amount of feed and when the plunger is set to move short distances to provide an extremely light feed, the plunger soon packs the material at opposite sides thereof and ceases to discharge equal amounts off the ends of the plate, but by having the plunger move with a fixed stroke in varying increments all the material ahead of the plunger is dispensed off the ends of the plate during each stroke of the plunger.

By operating the plunger through fixed distances in varying increments of movement a slower running machine may also be provided with proportionately the same amount of feed of material, thereby reducing the power required, as well as wear and tear on the parts.

What I claim and desire to secure by Letters Patent is:

1. An apparatus of the character described including a hopper having an opening for flow of material from the hopper, a receiver for the material having parallel sides and a bottom spaced below the opening to form a feeding chamber open at the ends, a plunger having sliding contact with the sides and bottom of the receiver, and means for reciprocating the plunger in a succession of steps in alternate directions to effect feed of material in intermittent amounts alternately from the respective ends of the receiver.

2. An apparatus of the character described including a hopper having an open bottom for flow of material from the hopper, a receiver for the material having parallel sides and a bottom spaced below the opening to form a feeding chamber open at the ends, a plunger having sliding contact with the sides and bottom of the receiver, and means for reciprocating the plunger in a succession of steps in alternate directions to effect feed of material in intermittent amounts alternately from the respective ends of the receiver, and means for regulating extent of said steps to vary the feed of the material.

3. In an apparatus of the character described including a hopper having an opening for flow of material from the hopper, a receiver for the material having parallel sides and a bottom spaced below the opening to form a feeding chamber open at the ends, a plunger having sliding contact with the sides and bottom of the receiver, means for reciprocating the plunger in a succession of steps in the opposite direction to effect feed of material in intermittent amounts alternately from the ends of the receiver, means for regulating the length of said steps to vary feed of material over a predetermined time, and means cooperating with the reciprocating means for indicating the extent of said steps.

4. An apparatus of the character described including a hopper having an opening for flow of material from the hopper, a receiver for the material having parallel sides and a bottom spaced below the opening to form a feeding chamber open at the ends, a plunger having sliding contact with the sides and bottom of the receiver, means for reciprocating the plunger including a rock shaft, means connecting the rock shaft with the plunger, and means for oscillating the rock shaft by a series of steps in alternate directions for operating the plunger to effect continuous feed of material alternately from the respective ends of the receiver.

5. In an apparatus of the character described including a hopper having an opening for flow of material from the hopper, a receiver for the material having parallel sides and a bottom spaced below the opening to form a feed chamber open at the ends, means for reciprocating the plunger including a driving member, means for intermittently actuating the driving member, and means connected with the plunger for transmitting intermittent motion of said driving member to the plunger for reciprocating the plunger in alternate series of steps in opposite directions to effect feed of material in intermittent amounts alternately from the ends of the receiver.

ALFRED E. HINE.